Figure 1:
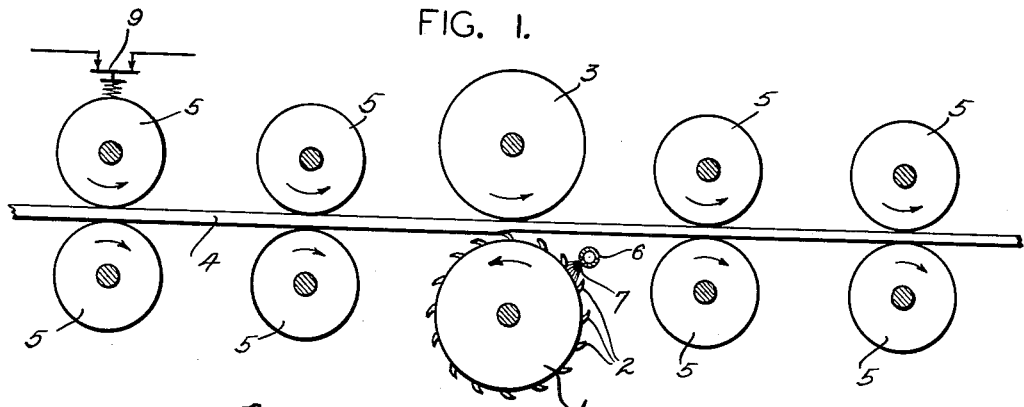

May 15, 1956 H. M. WILLIAMS 2,745,318
MILLING OF METAL
Filed Nov. 29, 1950

INVENTOR:
HENRY M. WILLIAMS
BY
ATTORNEYS.

United States Patent Office 2,745,318
Patented May 15, 1956

2,745,318

MILLING OF METAL

Henry M. Williams, Alton, Ill., assignor to Olin Mathieson Chemical Corporation, a corporation of Virginia Application November 29, 1950, Serial No. 198,149

2 Claims. (Cl. 90—11)

This invention relates to a method and apparatus for the milling of metal.

It has long been the practice in the milling of metal to cool the milling cutter blades and lubricate them prior to their passage through the metal with cutting liquid.

Difficulty has been experienced heretofore in obtaining a uniform distribution of the liquid over the length of the blades. When the liquid is spread on the surface of the metal to be milled, the effect of the liquid has been lost when the blades enter beneath the surface of the metal. Still a further difficulty has been that if sufficient cutting liquid is supplied to lubricate the blades and cover their surfaces, a great deal of the liquid is wasted both in run-off and particularly in being mixed with the chips, and the excessive amount of liquid mixing with the chips produces an undesirable tendency to clog the cutters.

Various devices have been proposed to supply the cutters with liquid, but none has proved satisfactory. For example, distributing rolls for spreading a thin film of liquid on the surface of the metal to be milled tend, when operating properly, to distribute a uniform film of liquid, but the problem of lubricating a cutter blade when it has cut beneath the surface is not solved thereby and a substantial amount of liquid must be used. It has been proposed to feed liquid through ports in the milling cutter blades themselves but the difficulty of obtaining uniform distribution remains.

One of the objects of this invention is to provide a method of and apparatus for supplying a uniformly distributed cutting fluid to the blades of a milling cutter in such a way as to accomplish maximum cooling and lubrication of the blades with the use of a minimum of cutting liquid.

Other objects will become apparent to those skilled in the art in the light of the specification and accompanying drawings.

In accordance with this invention, generally stated, cutting liquid is dispersed in gas to form a mist or vapor. The mist is uniformly distributed along the effective length of the cutter blades. A switch mechanism may be provided whereby the flow of mist is automatically started when a piece of stock enters the mill and cut off when the stock leaves the mill.

Figure 2:
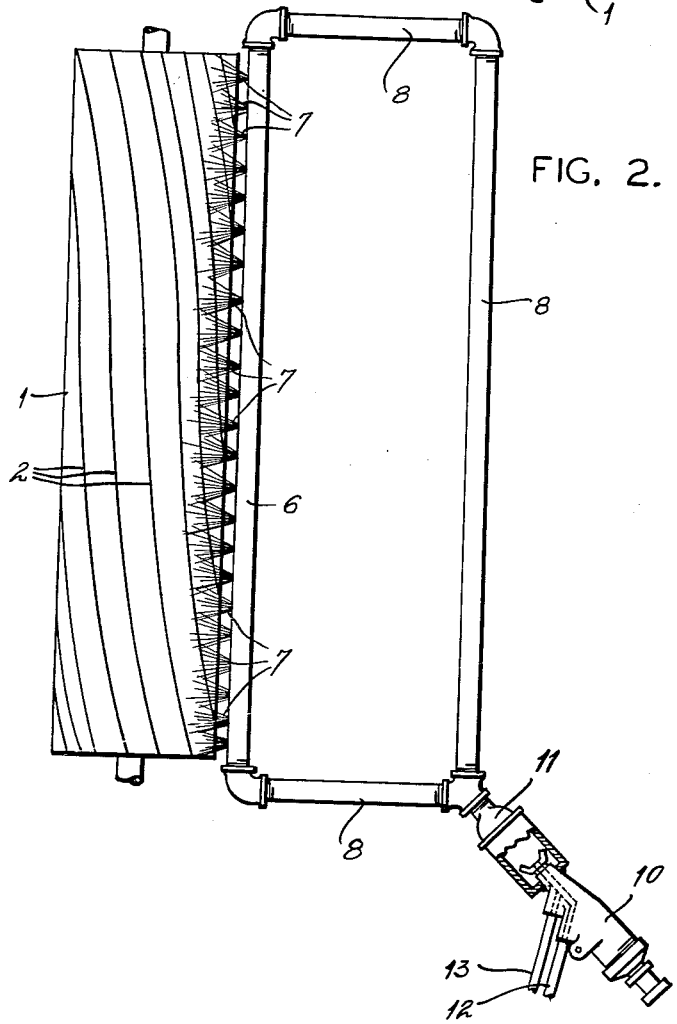

In the drawing:

Figure 1 is a diagrammatic view of a milling cutter with one embodiment of a cutting fluid delivering system constructed in accordance with this invention; and Figure 2 is a plan view, also somewhat diagrammatic in character, of the embodiment of cutting fluid system shown in Figure 1.

Referring now to the drawings for an illustrative embodiment of this invention, and particularly to Figure 1, 1 represents a milling cutter for milling metal strip. Milling cutter 1 is provided with blades 2 and a backing roll 3 which serves to support the strip 4 while it is being milled. Rolls 5 serve to feed the srtip 4 to the cutter and carry the milled strip beyond the cutter. A cutting fluid distributing pipe 6 extends for the full length of the milling cutter 1 substantially parallel with the axis thereof, and the wall of the pipe adjacent the cutter is provided with a series of ports 7 from which the fluid is directed toward the blades, as shown. The ports 7 are positioned closely adjacent but clear of the blades 2 on the side at which the blades approach the metal strip 4, and near the point at which the blades engage the strip, that is, in the region outside the periphery of cutter 2 between the already milled surface of strip 4 and a perpendicular thereto which is tangent with the periphery of the cutter blades. A microswitch 9 is shown diagrammatically as being controlled by upward or downward movement of the first feed roll 5.

Referring now to Figure 2, the distributing pipe 6 is provided with a series of holes 7 along the length of the blades 2 of the milling cutter 1. The fluid is fed to the distributing pipe 6 at both ends of that pipe from a header pipe 8. The cutting fluid utilized in this invention is produced by an atomizer 10 connected to header pipe 8, in the embodiment shown, by a reducer 11. A cutting liquid supply pipe 12, from a source of cutting liquid not here shown, and a compressed gas supply pipe 13, from a source of compressed gas not here shown, are connected to atomizer 10. A suitable commercial spray gun mounted on a pipe may be used for the atomizer 10, but effective atomizing must be obtained.

In the operation of the milling cutter shown as an illustrative embodiment, the strip 4 is fed against the rotation of the milling cutter blades 2. When the strip enters the mill, microswitch 9 is actuated by the movement of first feed roll 5, to open atomizer 10 (as by a solenoid) to start the flow of cutting fluid. Cutting liquid (which may be any of a number of known cutting oils depending upon the type of stock being milled, the depth of cut to be taken, etc.), and compressed gas (generally compressed air) are fed to the atomizer 10 in such proportions and under such conditions as to produce a fine mist or vapor. This mist is forced through the header 8 to the distributing pipe 6 and through the holes 7. The holes 7 are so spaced, positioned and constructed as to direct an even and copious flow of mist onto and over the entire length of the blades as they pass. When the end of the strip passes the first feed roll 5, microswitch 9 is opened and the flow of fluid is cut off. A delayed action relay may be interposed in the circuit momentarily to delay the cut-off of the flow to permit the strip to clear the milling cutter, or the cut-off may be accomplished by a separate switch positioned on the discharge side of the milling cutter.

It has been found that so dispersing the cutting liquid in gas and distributing the mist uniformly over the blades imparts an exceptional lubricating and cooling effect to the cutting liquid with a substantial reduction in the amount of liquid used, at the same time allowing a marked increase in milling rate.

Numerous variations in the apparatus for carrying out the method described will occur to those skilled in the art in the light of this disclosure. Both the method and apparatus described may be used in various milling operations. While an upmilling operation has been described as an illustration, the system is applicable as well to downmilling. In the latter operation, the mist is still distributed over the blades on the side from which the blades approach the strip.

While the cheapest and simplest atomizing gas is compressed air, it may be desirable in some circumstances to use a more inert or reducing or even oxidizing gas. In this connection, mist may be so directed as not only to bathe the blades but to blanket the newly-cut surface of the metal.

It can be seen that by obtaining a uniform distribution of cutting liquid over the effective surface of the blades, in accordance with this invention, all of the difficulties enumerated in the introductory paragraphs are eliminated. The liquid is applied in a narrow zone. The surface of the metal strip need not be bathed in cutting liquid before it reaches the milling cutter, although, as has been indicated, some om the mist may reach the surface being cut as it is cut, accompanying the blade itself. The use of a mist allows uniform distribution with simple equipment. A relatively small amount of liquid is required which eliminates the problems arising from the use of an excess of liquid. The blast of mist, in fact, tends to blow out any chips. The distribution of liquid over the entire cutting surface of the blade lubricates the blade during its travel through and beneath the surface of the metal. The arrangement of switches to assure a flow of fluid only during the actual milling operation further minimizes the amount of fluid used.

Having thus described the invention, what is claimed and desired to be secured by Letters Patent is:

1. The method of lubricating and cooling the cutting surfaces of a milling cutter during a milling operation, comprising, dispersing a cutting liquid in gas to form a mist, and projecting said mist in a substantially radial direction against a circumferentially-narrow zone of said cutter but extending for the full axial dimension of the cutter, said circumferentially-narrow zone being on the side of the cutter which is approaching the locus of cutting and being wholly located substantially less than 90° away from the locus of cutting.

2. In combination with a milling cutter, apparatus for lubricating and cooling the cutting surfaces of the milling cutter during a milling operation on a flat sheet, comprising, an atomizer for converting cutting liquid into a mist, a distributing pipe connected with said atomizer and positioned adjacent the side of the milling cutter from which the blades thereof approach the surface of the sheet to be milled, said distributing pipe having an aligned series of closely spaced ports addressed toward said cutter, said series of ports extending for the full axial dimension of the cutter, and each of said ports being located in the region immediately outside the periphery of the cutter between the already milled surface of the sheet being milled and a plane perpendicular to said surface which is tangent with the periphery of the cutter.

References Cited in the file of this patent

UNITED STATES PATENTS

| 1,036,173 | Arey | Aug. 20, 1912 |
| 1,093,581 | Baker | Apr. 14, 1914 |
| 2,084,022 | Frank | June 15, 1937 |
| 2,140,838 | Hart | Dec. 20, 1938 |
| 2,290,061 | Matia | July 14, 1942 |
| 2,299,852 | Shaner et al. | Oct. 27, 1942 |
| 2,342,199 | Hurtt | Feb. 22, 1944 |
| 2,550,899 | Tsamboky | May 1, 1951 |

FOREIGN PATENTS

| 317,885 | Germany | Dec. 31, 1919 |